United States Patent [19]

Howard

[11] 4,052,222

[45] Oct. 4, 1977

[54] TREATMENT OF PIGMENT

[75] Inventor: Peter Barry Howard, Cleveland, England

[73] Assignee: Tioxide Group Limited, Cleveland, England

[21] Appl. No.: 692,904

[22] Filed: June 4, 1976

[51] Int. Cl.$^2$ .......... C09C 1/36

[52] U.S. Cl. .......... 106/300; 106/308 B

[58] Field of Search .......... 106/300, 308 B

[56] References Cited

U.S. PATENT DOCUMENTS

| | | | |
|---|---|---|---|
| 3,513,007 | 5/1970 | Hederer | 106/300 |
| 3,515,566 | 6/1970 | Moody et al. | 106/300 |
| 3,897,261 | 7/1975 | Allen | 106/300 |

*Primary Examiner*—Patrick P. Garvin
*Assistant Examiner*—J. V. Howard
*Attorney, Agent, or Firm*—Schuyler, Birch, Swindler, McKie & Beckett

[57] ABSTRACT

A process for the treatment of titanium dioxide pigment in which there is added to a slurry of the pigment a compound of silicon, of aluminium, of zirconium and of titanium, changing the pH of the slurry to 7.5 to 8.5 prior to adding a compound of silicon, an acidic compound of aluminium and an alkaline compound of aluminium, thereby producing a coated pigment.

17 Claims, No Drawings

TREATMENT OF PIGMENT

This invention relates to a process for the treatment of a pigment and particularly to the treatment of titanium dioxide pigment.

According to the present invention a process for the treatment of titanium dioxide pigment comprises forming an aqueous dispersion of pigmentary titanium dioxide containing a first water-soluble compound of silicon in an amount of from 1 to 2% by weight expressed as $SiO_2$, adding to the dispersion a first acidic water-soluble compound of aluminium in an amount of from 1.5 to 2.5% by weight expressed as $Al_2O_3$, an acidic water-soluble compound of zirconium in an amount of from 0.5 to 1.5% by weight expressed as $ZrO_2$ and an acidic water-soluble compound of titanium in an amount of from 1.0 to 2.0% by weight expressed as $TiO_2$, changing the pH of the dispersion to a value in the range 7.5 to 8.5 and then adding to the dispersion a second water-soluble compound of silicon in an amount of from 1 to 2% by weight expressed as $SiO_2$, a second acidic water-soluble compound of aluminium in an amount of from 1 to 2% by weight expressed as $Al_2O_3$ and an alkaline water-soluble compound of aluminium in an amount of from 0 to 1.5% by weight expressed as $Al_2O_3$, all the percentages by weight being based on the weight of $TiO_2$ in the pigment and recovering the so treated pigment.

The present invention provides a process for the treatment of titanium dioxide pigment in such a manner that there becomes associated with the pigment a number of hydrous metal oxides so that the pigment when incorporated in a paint has a reduced photochemical activity. The titanium dioxide pigment which is treated by the process of the present invention is preferably a "sulphate" pigment, i.e. a calcined titanium dioxide pigment which is prepared by a well known "sulphate" process which involves the digestion of a titaniferous ore with concentrated sulphuric acid to produce a digestion cake which is then dissolved in water or dilute acid. The solution of titanyl sulphate so obtained, after suitable purification treatment, is hydrolysed in the presence of seed nuclei to precipitate a hydrous form of titanium dioxide which is subsequently calcined at an elevated temperature to develop the pigmentary properties of the titanium dioxide.

Preferably, the titanium dioxide pigment which is treated by the process of the present invention is rutile titanium dioxide, i.e. the pigment contains at least 95% of its $TiO_2$ content in the rutile form as opposed to the anatase form.

Preferably, the titanium dioxide pigment to be treated by the process of the present invention contains from 0.1 to 0.5% by weight $Al_2O_3$ based on the weight of $TiO_2$. This alumina is formed during the calcination process as a result of the addition to the pigment, prior to calcination, of an aluminium compound such as aluminium sulphate.

Usually, prior to treatment by the process of the present invention the pigmentary titanium dioxide calciner discharge is milled in a dry milling process such as by means of a ring or roller mill, or hammer mill. The pigment so obtained is then formed into an aqueous dispersion through use of a water-soluble compound of silicon as the dispersant. Preferably, the titanium dioxide pigment is mixed with water in the presence of a water-soluble silicate, such as an alkali metal silicate, preferably sodium silicate, and then wet milled, preferably by means of a sand mill. The amount of the water-soluble compound of silicon added as dispersant is from 1 to 2% by weight expressed as $SiO_2$ on the weight of $TiO_2$. Usually during wet milling of the aqueous dispersion of pigmentary titanium dioxide no heat is supplied. Usually the concentration of the titanium dioxide pigment in the dispersion at the conclusion of wet milling will be from 600 to 1000 grams per litre, although this will depend on the particular process conditions employed in a particular factory. Subsequent to wet milling it is desirable to reduce the concentration to the titanium dioxide pigment in the slurry to a value of from 150 to 250 grams per litre. In addition the temperature of the dispersant prior to carrying out the subsequent treatment stages is usually raised to a value of from 40° to 65° C, preferably about 45° C.

To the aqueous dispersion of pigmentary titanium dioxide containing the water-soluble compound of silicon there is then added a first acidic compound of aluminium in an amount of from 1.5 to 2.5% by weight expressed as $Al_2O_3$ based on the weight of $TiO_2$ in the pigment. Preferably the amount of the water-soluble compound of aluminium is from 1.8 to 2.2% by weight, and the water-soluble compound of aluminium is added in the form of an aqueous solution. Any acidic water-soluble compound of aluminium that is hydrolysable to form a hydrous oxide of aluminium may be employed in the process of the present invention, and typical examples are aluminium chloride, aluminium nitrate and aluminium sulphate. Aluminium sulphate is a preferred source of aluminium.

An acidic water-soluble compound of titanium is also added to the aqueous dispersion containing the water-soluble compound of silica, and the amount of the compound of titanium is from 1.0 to 2.0% by weight expressed as $TiO_2$ on the weight of $TiO_2$ in the pigment. Preferably the amount of the compound of titanium is from 1.2 to 1.6% by weight expressed as $TiO_2$. Usually the water-soluble compound of titanium is added in the form of an aqueous solution and suitable acidic compounds of titanium are those which are hydrolysable to form a hydrous oxide of titanium, examples of which are titanium tetrachloride and titanyl sulphate.

An acidic water-soluble compound of zirconium is also added to the aqueous dispersion containing the water-soluble compound of silicon, in an amount of from 0.5 to 1.5% by weight expressed as $ZrO_2$. Preferably the amount of the compound of zirconium is from 0.8 to 1.2% by weight expressed as $ZrO_2$. It is also preferred to add the water-soluble compound of zirconium in the form of an aqueous solution. The water-soluble compound of zirconium which is suitable is one which is hydrolysable to form a hydrous oxide of zirconium, and typical examples are zirconium nitrate and zirconium sulphate.

Preferably the water-soluble compounds of aluminium, zirconium and titanium are added in the form of a mixed solution of the sulphate of the metals. Such a solution contains aluminium sulphate, titanyl sulphate and zirconium sulphate in sulphuric acid and will have a pH of between 0.7 to 1.2. The mixed solution, when used, is added to the dispersion over a period of say 15 to 45 minutes, and after the addition the dispersion is agitated for a further period of from 5 to 15 minutes to produce homogenity.

The pH of the aqueous dispersion is then changed to a value to within the range 7.5 to 8.5 by the addition of an alkali such as an aqueous alkali metal hydroxide, for example, sodium hydroxide, and the aqueous dispersion mixed for a further period of from 2 to 10 minutes.

To the aqueous dispersion of titanium dioxide after the adjustment of the pH to a value within the range 7.5 to 8.5 there is then added a second water-soluble compound of silicon in an amount of from 1 to 2% by weight expressed as $SiO_2$ on the weight of $TiO_2$ on the pigment. Preferably the amount of the water-soluble compound of silicon is from 1.4 to 1.6% by weight expressed as $SiO_2$. The water-soluble compound of silicon will usually be a similar compound to that added previously to the aqueous dispersion and preferably is an alkali metal silicate such as sodium silicate. Typically the water-soluble compound of silicon is added to the aqueous dispersion over a period of from 10 to 20 minutes, and after the addition has been completed the aqueous dispersion is mixed for a period of from 5 to 15 minutes.

A second acidic water-soluble compound of aluminium is then added to the aqueous dispersion in an amount of from 1.0 to 2.0% by weight expressed as $Al_2O_3$ on the weight of $TiO_2$ in the pigment, and preferably from 1.2 to 1.7% by weight as $Al_2O_3$. Any acidic water-soluble compound of aluminium may be employed which is hydrolysable to produce a hydrous oxide of aluminium, and typical aluminium salts which are useful are aluminium sulphate and aluminium nitrate, although it is preferred to add aluminium sulphate. The aluminium salt is preferably added in the form of a solution over a period of from 5 to 20 minutes, usually between 12 and 16 minutes and mixed after the completion of the addition for a further 5 to 15 minutes.

An alkaline reacting water-soluble compound of aluminium is then added to the aqueous dispersion of titanium dioxide in an amount of from 0 to 1.5 weight percent expressed as $Al_2O_3$ on the weight of $TiO_2$ in the pigment. Preferably the amount of the alkaline water-soluble compound of aluminium is from 0.7 to 1.2% by weight expressed as $Al_2O_3$, and preferably the compound is added in the form of an aqueous solution. Typical alkaline water-soluble compounds of alumina are the alkali metal aluminates such as sodium aluminate, and if desired the solution may also contain an alkali metal hydroxide such as sodium hydroxide. Typically the water soluble compound of aluminium is added over a period of from 10 to 20 minutes, and after the addition has been completed the aqueous dispersion is mixed for a further period of from 20 to 60 minutes to achieve homogenity. After the addition of the reagents has been completed the aqueous dispersion is filtered and the treated titanium dioxide pigment recovered, washed and dried. If desired, the dried treated titanium dioxide pigment may be milled in a fluid energy mill optionally in the presence of an organic treating agent such as an amine, an alkanolamine or a polyol.

The pigments obtained by the process of the present invention are particularly useful for the manufacture of paints, particularly oleoresinous paints and when so used have a reduced photochemical activity, i.e. reduced chalking, improved gloss retention and reduced weight loss of the paint film.

It is believed that during the process of the present invention there becomes associated with the pigmentary particles of titanium dioxide a hydrous oxide of silicon and hydrous oxide of aluminium and of zirconium. It is believed that the particles of pigmentary titanium dioxide become coated with these hydrous oxides, but it may be that there is also precipitated into association with the pigment one or more metal silicates.

The present invention is illustrated in the following Examples.

EXAMPLE 1

A 2156g sample of dry milled, alumina (0.13%) additioned, rutile $TiO_2$ "sulphate" based pigment was suspended in 2355 mls of distilled water. To the suspension were added 225 mls of sodium silicate solution (10.0% $SiO_2$ and 3.18% $Na_2O$) and 5140 mls of Ottawa sand. The slurry was sandmilled for 60 minutes in an 8 inches diameter pot with 4 × 5 inches diameter discs (separation 1.5 inches) at 1890 r.p.m. The sand was separated from the pigment by passing the slurry successively through a 100 mesh and then a 325 mesh sieve.

Sank-free slurry containing 800g $TiO_2$ was diluted to 200g $l^{-1}$ with distilled water, stirred to ensure efficient mixing during subsequent reagent additions, and heated to 45° C. The pH at this stage was 10.4. 216 mls of a mixed acidic solution of aluminium sulphate, zirconium orthosulphate and titanyl sulphate (7.4% $Al_2O_3$, 3.7% $ZrO_2$ and 5.5% $TiO_2$) were added at a rate of 10.8 mls per minute. The slurry was mixed for 10 minutes and the pH at the end of this stage was 1.3.

The slurry pH was changed, over 10 minutes, to pH 8.0 with 2.75M sodium hydroxide and mixed for 5 minutes. 120 mls of sodium silicate solution (10.0% $SiO_2$ and 3.18% $Na_2O$) were added at a rate of 8 mls per minute and mixed for 10 minutes. The pH at the end of this stage was 8.8. 129 mls of aluminium sulphate solution (9.3% $Al_2O_3$) were added at a rate of 8.6 mls per minute and the slurry mixed for 10 minutes. The pH at the end of this stage was 3.6. 114 mls of caustic sodium aluminate (8.2% $Al_2O_3$ and 19.4% $Na_2O$) were added at a rate of 7.6 mls per minute and the slurry was mixed for a further 40 minutes. The pH at the end of this stage was 8.0.

The treated titanium dioxide pigment was separated from the slurry by filtration washed twice with distilled water, reslurried in distilled water, again filtered and washed twice then dried for 16 hours at 105° C. The dried pigment was fluid energy milled in a laboratory 6 inches air microniser.

The pigment so obtained was incorporated in a stoving paint based on a thermoplastic acrylic resin (Paraloid A21/Paraloid B99/ Santicizer 16) with a pigment:binder ratio of 0.5:1. Coated stainless steel panels were prepared, stoved at 120° C for 30 minutes, tested in a Marr Weatherometer for various periods of time. The durability expressed as Gloss reading (G) and Chalk rating (C) were taken.

The results are compared with those of a control being similar paint containing a titanium dioxide pigment having acceptable properties and having a coating of hydrous titania (1% by weight as $TiO_2$), hydrous alumina (2.5% $Al_2O_3$ by weight) and hydrous silica (1.5% $SiO_2$) and prepared by a conventional method.

The pigment was also incorporated in a stoving paint based on a thermosetting acrylic resin system with a pigment/binder ratio of 1.0:1.0. Coated stainless steel panels were prepared, stoved at 120° C for 30 minutes and tested in a Marr Weatherometer. The durability expressed as Gloss reading (G) and Chalk rating (C) were determined. Similar paints containing a titanium dioxide pigment having a coating of hydrous titania (1% by weight as $TiO_2$) and hydrous alumina (2.5%

$Al_2O_3$ by weight) and hydrous silica (1.5% $SiO_2$) were prepared and tested as the control.

The pigment was also tested to determine their stoving gloss after baking at different temperatures in an alkyd/urea formaldehyde stoving system, and compared with those obtained using a titanium dioxide pigment coated with alumina 6% as $Al_2O_3$ and 1 to 2% $TiO_2$.

The results of these tests are shown below:

TABLE 1

| | | Durability in thermoplastic acrylic resin | | | | | |
|---|---|---|---|---|---|---|---|
| | | After Time (Hours) | | | | | |
| Example | Test | Initial | 250 | 500 | 750 | 1000 | 1250 |
| 1 | G | 90 | 82 | 68 | 71 | 53 | 55 |
| | C | 10 | 9 | 9 | 9 | 9 | 9 |
| Control | G | 86 | 84 | 63 | 52 | 25 | 1 |
| | C | 10 | 9 | 9 | 9 | 8 | 6 |

TABLE 2

| | | Durability in thermosetting acrylic resins | | | | | |
|---|---|---|---|---|---|---|---|
| | | After Time (Hours) | | | | | |
| Example | Test | Initial | 250 | 500 | 750 | 1000 | 1250 |
| 1 | G | 100 | 95 | 85 | 73 | 60 | 44 |
| | C | 10 | 9 | 9 | 9 | 9 | 9 |
| Control | G | 95 | 95 | 77 | 50 | 32 | 16 |
| | C | 10 | 9 | 9 | 9 | 8 | 7 |

TABLE 3

| | Stoving gloss | |
|---|---|---|
| Example | normal schedule 120° | overbake schedule 180° |
| 1 | 77.0 | 33.0 |
| Control | 67.0 | 16.5 |

EXAMPLE 2

A 2156 gram sample of dry milled rutile "sulphate" titanium dioxide base pigment was suspended in 2330 mls of distilled water and 323 mls sodium silicate solution (10.0% $SiO_2$ and 3.18% $Na_2O$) were added. 5140 mls of Ottawa sand was added to the slurry which was then milled for 60 minutes in an 8 inches diameter pot with 4 × 5 inches discs (separation 1.5 inches) at 1890 r.p.m. The sand was separated from the pigment by passing the slurry successively through a 100 mesh then a 325mesh sieve. Sand-free slurry containing 1000 grams of pigment was taken, diluted to 200 $gl^{-1}$ with distilled water, stirred to ensure efficient mixing during subsequent reagent additions and heated to 45° C. The pH at this stage was 9.6.

270 mls of a mixed acidic solution of aluminium sulphate, zirconium orthosulphate and titanyl sulphate (7.4% $Al_2O_3$, 3.7% $ZrO_2$ and 5.4% $TiO_2$) were added at a rate of 13.5 mls per minute and mixed for 10 minutes. The pH at this stage was 1.2. The pH of the slurry was raised to 8.0 with 2.75M sodium hydroxide over 10 minutes. 150 mls sodium silicate solution (10.0% $SiO_2$ and 3.18% $Na_2O$) at a rate of 10 mls per minute and the slurry mixed for 10 minutes. The pH at this stage was 8.6. 252 mls of aluminium sulphate (10.1% $Al_2O_3$) was added at a rate of 10 mls per minute. During this addition the pH of the slurry fell to 4.5 and was maintained in the range pH 4.0–4.5 by the simultaneous but separate addition of 275M sodium hydroxide. At this stage the pH was 4.5. The slurry pH was raised to pH 8.0 with 2.75M sodium hydroxide over 15 minutes and maintained at pH 8.0 for 45 minutes.

The treated titanium dioxide was recovered by filtration. The filter cake was washed twice with distilled water, reslurried in distilled water, refiltered and again washed twice. The filter cake was additioned with 0.4% (on weight of pigment) triethanolamine dried for 16 hours at 105° C then fluid energy milled (twice) in an 8 inches steam microniser.

EXAMPLE 3

A 2156 gram sample of dry milled rutile "sulphate" titanium dioxide base pigment was suspended in 2330 mls of distilled water and 323 mls of sodium silicate solution (10.0% $SiO_2$ and 3.18% $Na_2O$) were added. 5140 mls Ottawa sand were added to the slurry which was then milled for 60 minutes in an 8 inches diameter pot with 4 × 5 inches discs (separation 1.5 inches) at 1890 r.p.m. The sand was separated from the pigment by passing the slurry successively through a 100 mesh and then a 325 mesh sieve. Sand-free slurry containing 1 kg of titanium dioxide was diluted to 200 $gl^{-1}$ with distilled water, stirred to ensure efficient mixing during subsequent reagent additions and heated to 45° C. The pH at this stage was 9.2.

295 mls of a mixed acidic solution of aluminium sulphate, zirconium orthosulphate and titanyl sulphate (7.8% $Al_2O_3$, 1.9% $ZrO_2$ and 5.6% $TiO_2$) were added at a rate of 15 mls per minute and mixed for 10 minutes. At the end of this stage the pH was 1.1. The slurry pH was adjusted to 8.0 with 2.75M sodium hydroxide over 15 minutes. 150 mls of sodium silicate solution (10.0% $SiO_2$ and 3.18% $Na_2O$) were added at a rate of 10 mls per minute and mixed for 10 minutes. The pH at this stage was 8.3. 152 mls of aluminium sulphate solution (10.1% $Al_2O_3$) were added at a rate of 10 mls per minute then mixed for 5 minutes. The pH at this stage was 3.2. 93 mls of caustic sodium aluminate (8.2% $Al_2O_3$ and 19.0% $Na_2O$) were added at a rate of 6.2 mls per minute then mixed for 45 minutes. The pH at this stage was 8.0.

The treated titanium dioxide pigment was recovered by filtration. The filter cake was washed twice with distilled water, reslurried in distilled water, refiltered and again washed twice. The pigment was additioned with triethanolamine (0.4% on weight of pigment), dried for 16 hours at 105° C, then fluid energy milled (twice) in an 8 inches steam microniser.

EXAMPLE 4

A 2156 gram sample of dry milled rutile $TiO_2$ "sulphate" based pigment was suspended in 2355 mls of distilled water. To the suspension were added 323 mls sodium silicate solution (10% $SiO_2$ and 3.18% $Na_2O$) and 5140 mls of Ottawa sand. The slurry was sand-milled for 60 minutes in an 8 inches diameter pot with 4 × 5 inches diameter discs (separation 1.5 inches) at 1890 r.p.m. The sand was separated from the pigment by passing the slurry successively through a 100 mesh and then 325 mesh sieve.

The sand-free slurry was diluted to 4.54 litres at 220 g/l $TiO_2$ with distilled water, stirred to ensure efficient mixing during subsequent reagent additions, and heated to 45° C. The pH at this stage was 9.6. 298 mls of an acidic solution of aluminium sulphate, zirconium, orthosulphate and titanyl sulphate (7.4% $Al_2O_3$, 3.7% $ZrO_2$ and 5.5% $TiO_2$) were added at a rate of 14.9 mls per minute. The slurry was mixed for 10 minutes and the pH at this stage was 1.3.

The slurry pH was changed, over 10 minutes, to pH 8.0 with 2.75M sodium hydroxide and mixed for 5 minutes. 150 mls of sodium silicate solution (10% $SiO_2$ and 3.18% $Na_2O$) were added at a rate of 15 mls per minute and mixed for 10 minutes. The pH at this stage was 8.6.

54 mls of aluminium sulphate solution (9.3% $Al_2O_3$) were added at a rate of 11 mls per minute and the slurry mixed for 10 minutes. The pH at the end of this stage was 4.1.

85 mls of caustic sodium aluminate (8.2% $Al_2O_3$ and 19.4% $Na_2O$) were added at a rate of 7 mls per minute and the slurry was mixed for a further 40 minutes.

The pH at the end of this stage was 8.0. The treated titanium dioxide pigment was separated from the slurry by filtration, washed twice with distilled water, reslurried in distilled water, again filtered and washed twice then additioned with triethanolamine (0.4% on $TiO_2$), dried for 16 hours at 105° C. The dried pigment was fluid energy milled in a laboratory 8 inches steam microniser.

The pigment so obtained in Examples 2, 3 and 4 was incorporated in a stoving paint based on a thermoplastic acrylic resin system with a pigment:binder ratio of 0.5:1. Coated stainless steel panels were prepared, stoved at 120° C for 30 minutes and tested in a Marr Weatherometer to determine their durability expressed as Gloss reading (G) and Chalk rating (C).

The results are compared with those of a control being similar paint containing a pigment having acceptable properties and having a coating of hydrous titania (1% by weight as $TiO_2$), hydrous alumina (2.5% $Al_2O_3$ by weight) and hydrous silica (1.5% $SiO_2$).

The pigment was also incorporated in a stoving paint based on a thermosetting acrylic resin with a pigment:binder ratio of 1.0:1.0. Coated stainless steel panels were prepared, stoved at 120° C for 30 minutes and tested in a Marr Weatherometer and durability measured.

The results are compared to those of a control being a similar paint containing a pigment having acceptable properties and having a coating of hydrous titania (1% by weight $TiO_2$), hydrous alumina (2.5% $Al_2O_3$ by weight) and hydrous silica (1.5% $SiO_2$).

The pigments were also tested to determine their stoving gloss and colour after baking at different temperatures in an alkyd/ureaformaldehyde stoving system and compared with those obtained using a titanium dioxide pigment coated with alumina (6% as $Al_2O_3$) and 1 to 2% $TiO_2$.

The results are shown in the following Tables.

TABLE 4

| | | Durability in thermoplastic acrylic resin | | | | | |
|---|---|---|---|---|---|---|---|
| | | After Time (Hours) | | | | | |
| Example | Test | Initial | 250 | 500 | 750 | 1000 | 1250 |
| 2 | G | 92 | 87 | 79 | 70 | 67 | 56 |
| | C | 10 | 10 | 10 | 10 | 9 | 9 |
| 3 | C | 10 | 10 | 10 | 10 | 9 | 9 |
| 4 | C | 10 | 10 | 10 | 10 | 9 | 9 |
| Control | G | 86 | 84 | 45 | 34 | 9 | 2 |
| | C | 10 | 10 | 10 | 9 | 6 | 5 |

TABLE 5

| | | Durability in thermosetting acrylic resins | | | | | |
|---|---|---|---|---|---|---|---|
| | | After Time (Hours) | | | | | |
| Example | Test | Initial | 250 | 500 | 750 | 1000 | 1250 |
| 2 | G | 86 | 85 | 76 | 56 | 27 | 11 |
| | C | 10 | 10 | 10 | 9 | 9 | 9 |
| 3 | G | 80 | 85 | 63 | 39 | 19 | 9 |
| | C | 10 | 10 | 10 | 9 | 8 | 8 |
| 4 | G | 86 | 82 | 56 | 42 | 19 | 7 |
| | C | 10 | 10 | 10 | 9 | 8 | 7 |
| Control | G | 88 | 74 | 46 | 20 | 9 | 4 |

TABLE 5-continued

| | | Durability in thermosetting acrylic resins | | | | | |
|---|---|---|---|---|---|---|---|
| | | After Time (Hours) | | | | | |
| Example | Test | Initial | 250 | 500 | 750 | 1000 | 1250 |
| | C | 10 | 10 | 10 | 6 | 6 | 6 |

TABLE 6

| | Stoving gloss | | Stoving colour | |
|---|---|---|---|---|
| Example | normal schedule 120° | overbake schedule 180° | before UV exposure | after UV (1 hour) |
| 2 | 76.0 | 18.0 | — | — |
| 3 | 74.0 | 17.0 | +¼ to +½ | unrateably good |
| 4 | 77.0 | 22.5 | +¼ to +½ | +¼ to +½ |
| Control | 67.0 | 16.5 | std* | std |

*std = standard
+¼ to +½ = improved results

What is claimed is:

1. A process for the treatment of titanium dioxide pigment comprising a. forming an aqueous dispersion of pigmentary titanium dioxide containing a first water-soluble compound of silicon in an amount of from 1 to 2% by weight expressed as $SiO_2$, b. adding to the dispersion a first acidic water-soluble compound of aluminum in an amount of from 1.5 to 2.5% by weight expressed as $Al_2O_3$, an acidic water-soluble compound of zirconium in an amount of from 0.5 to 1.5% by weight expressed as $ZrO_2$, and an acidic water-soluble compound of titanium in an amount of from 1.0 to 2.0% by weight expressed as $TiO_2$, c. changing the pH of the dispersion to a value in the range 7.5 to 8.5, and then d. adding to the dispersion a second water-soluble compound of silicon in an amount of from 1 to 2% by weight expressed as $SiO_2$, then a second acidic water-soluble compound of aluminum in an amount of from 1 to 2% by weight expressed as $Al_2O_3$, and then an alkaline water-soluble compound of aluminum in an amount of from 0 to 1.5% by weight expressed as $Al_2O_3$, all the percentages by weight being based on the weight of $TiO_2$ in the pigment and recovering the so treated pigment.

2. A process according to claim 1 in which the aqueous dispersion of pigmentary titanium dioxide is formed from calcined titanium dioxide.

3. A process according to claim 1 in which the titanium dioxide contains at least 95% of its $TiO_2$ content in the rutile form.

4. A process according to claim 1 in which the said titanium dioxide pigment contains from 0.1 to 0.5% by weight $Al_2O_3$ based on the weight of $TiO_2$.

5. A process according to claim 1 in which the aqueous dispersion of pigmentary titanium dioxide containing the water-soluble compound of silicon is wet milled.

6. A process according to claim 1 in which the amount of the first acidic water-soluble compound of aluminium is from 1.8 to 2.2% by weight expressed as $Al_2O_3$.

7. A process according to claim 1 in which the amount of the acidic water-soluble compound of zirconium is from 0.8 to 1.2% by weight expressed as $ZrO_2$.

8. A process according to claim 1 in which the amount of the acidic water-soluble compound of titanium is from 1.2 to 1.6% by weight expressed as $TiO_2$.

9. A process according to claim 1 in which the acidic water-soluble compounds of aluminium, titanium and zirconium are added to the aqueous dispersion in the form of a mixed aqueous solution.

10. A process according to claim 9 in which the mixed aqueous solution contains aluminium sulphate, titanyl sulphate and zirconium sulphate and has a pH of from 0.7 to 1.2.

11. A process according to claim 1 in which the pH of the aqueous dispersion is changed to a value within the range 7.5 to 8.5 by the addition of an alkali.

12. A process according to claim 1 in which the amount of the second water-soluble compound of silicon is from 1.4 to 1.6% by weight expressed as $SiO_2$.

13. A process according to claim 1 in which the amount of the second water-soluble compound of aluminium is from 1.2 to 1.7% by weight expressed as $Al_2O_3$.

14. A process according to claim 1 in which the alkaline watersoluble compound of aluminium is added to the aqueous dispersion in an amount of from 0.7 to 1.2% by weight expressed as $Al_2O_3$.

15. A process according to claim 1 in which the treated titanium dioxide recovered is milled in a fluid energy mill.

16. A process according to claim 15 in which the pigment is treated with an amine, alkanolamine or a polyol during milling.

17. A process as claimed in claim 1 wherein the amount of said alkaline water-soluble compound of aluminum added is 0 and the pH of said dispersion is maintained in the range 4.0–4.5 by the simultaneous but separate addition of alkali during the addition of said second acidic water-soluble compound of aluminum, the pH of said dispersion then being raised to pH 8.0 before recovery of the treated pigment.

* * * * *